United States Patent
Wilson et al.

(10) Patent No.: US 11,797,358 B2
(45) Date of Patent: Oct. 24, 2023

(54) METHOD AND SYSTEM FOR PERFORMING APPLICATION PROGRAMMING INTERFACE CALLS BETWEEN HETEROGENEOUS APPLICATIONS AND CLOUD SERVICE PROVIDERS

(71) Applicant: Dell Products L.P., Round Rock, TX (US)

(72) Inventors: Lucas Avery Wilson, Cedar Park, TX (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 214 days.

(21) Appl. No.: 17/384,184

(22) Filed: Jul. 23, 2021

(65) Prior Publication Data

US 2023/0023981 A1    Jan. 26, 2023

(51) Int. Cl.
*G06F 9/54* (2006.01)
*G06F 11/34* (2006.01)

(52) U.S. Cl.
CPC .......... *G06F 9/541* (2013.01); *G06F 11/3409* (2013.01)

(58) Field of Classification Search
None
See application file for complete search history.

(56) References Cited

U.S. PATENT DOCUMENTS

| 10,310,850 B2 * | 6/2019 | Duppenthaler | G06F 8/75 |
| 10,339,153 B2 * | 7/2019 | Kurian | H04L 63/10 |
| 2016/0196125 A1 * | 7/2016 | Yura | H04L 67/34 717/175 |
| 2019/0281112 A1 * | 9/2019 | Bhat | H04L 67/1097 |

* cited by examiner

Primary Examiner — Tuan C Dao
Assistant Examiner — William C Wood
(74) Attorney, Agent, or Firm — Chamberlain, Hrdlicka, White, Williams & Aughtry

(57) ABSTRACT

Techniques described herein relate to a method for managing applications. The method may include obtaining, by a binding manager associated with a first CSP, a first API call from a first application; the binding manager identifies a first CSP API associated with the first CSP; identifies a second CSP API associated with the first API call; make a first determination that the second CSP API does not match the first CSP API; and in response to the first determination: translates the first API call into a format associated with the first CSP API to obtain a translated API call; initiates performance of the translated API call; obtains a first CSP API call return object in first CSP API format; translates the first CSP API call return object to obtain a translated CSP API call return object; and provides the translated CSP API call return object to the first application.

18 Claims, 7 Drawing Sheets

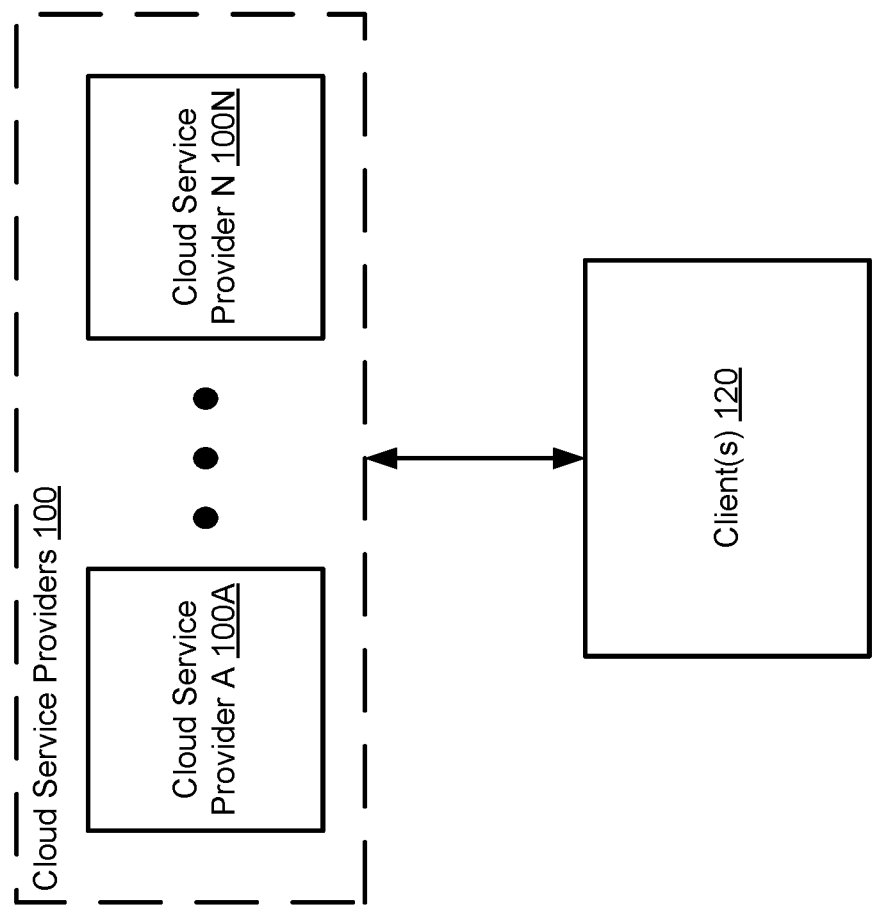

(12) United States Patent
US 11,797,358 B2

METHOD AND SYSTEM FOR PERFORMING APPLICATION PROGRAMMING INTERFACE CALLS BETWEEN HETEROGENEOUS APPLICATIONS AND CLOUD SERVICE PROVIDERS

BACKGROUND

Computing devices may provide services. To provide the services, the computing devices may include hardware components and software components. The computing devices may host one or more applications. The applications may be important to users. To improve the performance of the applications, the applications may be migrated from one computing device to another computing device. Applications may make application programming interface calls to the computing devices.

SUMMARY

In one aspect, a method for managing applications in accordance with one or more embodiments of the invention includes obtaining, by a binding manager associated with a first cloud service provider (CSP), a first application programming interface (API) call from a first application; in response to obtaining the first API call, the binding manager: identifies a first CSP API associated with the first CSP; identifies a second CSP API associated with the first API call; make a first determination that the second CSP API does not match the first CSP API; and in response to the first determination: translates the first API call into a format associated with the first CSP API to obtain a translated API call; initiates performance of the translated API call; obtains a first CSP API call return object in first CSP API format associated with the first CSP API; translates the first CSP API call return object into a format associated with the second CSP API to obtain a translated CSP API call return object; and provides the translated CSP API call return object to the first application.

In one aspect, a non-transitory computer readable medium in accordance with one or more embodiments of the invention includes computer readable program code, which when executed by a computer processor enables the computer processor to perform a method for managing applications in accordance with one or more embodiments of the invention. The method includes obtaining, by a binding manager associated with a first cloud service provider (CSP), a first application programming interface (API) call from a first application; in response to obtaining the first API call, the binding manager: identifies a first CSP API associated with the first CSP; identifies a second CSP API associated with the first API call; make a first determination that the second CSP API does not match the first CSP API; and in response to the first determination: translates the first API call into a format associated with the first CSP API to obtain a translated API call; initiates performance of the translated API call; obtains a first CSP API call return object in first CSP API format associated with the first CSP API; translates the first CSP API call return object into a format associated with the second CSP API to obtain a translated CSP API call return object; and provides the translated CSP API call return object to the first application.

In one aspect, a system for managing applications in accordance with one or more embodiments of the invention includes one or more client service providers (CSPs) and a binding manager of a first CSP of the CSPs. The binding manager is configured to obtain, by the binding manager, a first application programming interface (API) call from a first application; in response to obtaining the first API call, the binding manager: identifies a first CSP API associated with the first CSP; identifies a second CSP API associated with the first API call; make a first determination that the second CSP API does not match the first CSP API; and in response to the first determination: translates the first API call into a format associated with the first CSP API to obtain a translated API call; initiates performance of the translated API call; obtains a first CSP API call return object in first CSP API format associated with the first CSP API; translates the first CSP API call return object into a format associated with the second CSP API to obtain a translated CSP API call return object; and provides the translated CSP API call return object to the first application.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1A shows a diagram of a system in accordance with one or more embodiments of the invention.

DETAILED DESCRIPTION

Figure 1B:
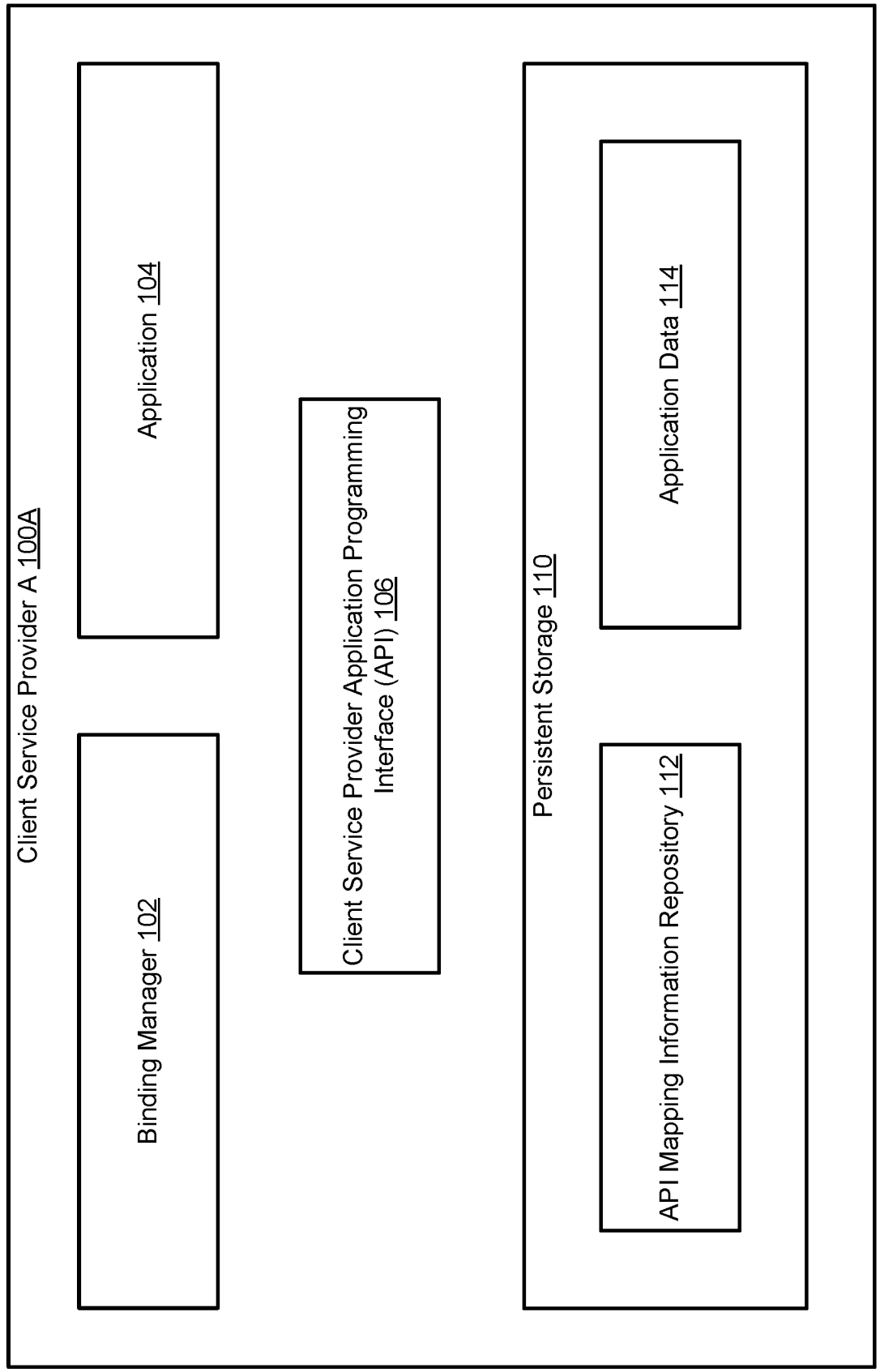
FIG. 1B shows a diagram of a client service provider in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate translating API calls between client service provider (CSP) application programming interfaces (APIs) and applications that are not configured to make API calls to the CSP APIs. A binding manager may obtain API calls from applications, determine if the CSP APIs associated with the application match the CSP APIs executing on the CSPs hosting the applications. The binding manager may translate API calls and API call return objects prior to sending the API calls and the API call return objects to the application and/or the CSP API. As a result, applications may migrate and/or otherwise be deployed to multiple types of CSPs without requiring reconfiguration of the applications and/or the CSP APIs. Accordingly, users of applications may efficiently deploy and/or migrate applications to a multitude of types of CSPs.

FIG. 1A shows a diagram of a system in accordance with one or more embodiments of the invention. The system may include cloud service providers (100) and client(s) (120). The system may include additional, fewer, and/or different components without departing from the invention. Each component of the system may be operably connected to any other components via any combination of wired and/or wireless connections. Each of the components of the system illustrated in FIG. 1A is discussed below.

In one or more embodiments of the invention, the cloud service providers (100) perform computer implemented services for users, (e.g., clients (120). The computer implemented services may include, for example, classification, inferencing, training machine learning models, executing machine learning models, natural language processing, image processing, and/or any other computer implemented service without departing from the invention. To perform the computer implemented services, the cloud service providers may host one or more applications (discussed below). The cloud service providers (100) may perform other and/or additional services without departing from the invention.

In one or more embodiments of the invention, the cloud service providers (100) include one or more cloud service providers. The cloud service providers (100) may include, for example, cloud service provider A (100A) and cloud service provider N (100N). The cloud service providers (100) may include any number of cloud service providers (e.g., 100A, 100N) without departing from the invention.

In one or more embodiments of the invention, each cloud service provider (e.g., 100A) is implemented using any number of computing devices (not shown). In one or more embodiments, a computing device is any device, portion of a device, or any set of devices capable of electronically processing instructions and may include any number of components, which include, but are not limited to, any of the following: one or more processors (e.g., components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors for obtaining data, and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a hyperconverged infrastructure, a cluster, a virtual machine, a logical container (e.g., for one or more applications), and/or any other type of device with the aforementioned requirements.

In one or more embodiments, any or all of the aforementioned examples may be combined to create a cloud service provider (e.g., 100A). Other types of computing devices may be used without departing from the invention.

In one or more embodiments, such computing devices may be operatively connected to other computing devices of an cloud service provider (e.g., 100A) in any way, thereby creating any topology of computing devices within the cloud service provider (e.g., 100A). In one or more embodiments, one or more computing devices in an cloud service provider (e.g., 100A) may be operatively connected to any one or more devices in any other cloud service provider (e.g., 100N).

In one or more embodiments of the invention, each cloud service provider (e.g., 100A) of the cloud service providers (100) may be similar and/or different cloud service provider types compared to other cloud service providers (e.g., 100N). A cloud service provider type may refer to the type and/or amount of computing devices and computing resources, geographic location, and/or other and/or additional information associated with a cloud service provider without departing from the invention. For example, a first cloud service provider type (e.g., an edge environment) may include sensors collecting data, controllers controlling the sensors, desktop devices, mobile computing devices, etc. Other cloud service provider types may include different computing devices. For example, a second cloud service provider type (e.g., a private data center) may have a device set that include servers with more compute ability than devices in the first cloud service provider type. Similarly, a third cloud service provider type (e.g., a public cloud environment) may include more powerful (e.g., having more compute resources) devices, a greater quantity of more powerful devices, specific architectures of sets of devices for performing certain tasks, etc. The cloud service provider types may include other and/or additional cloud service provider types without departing from the invention. For additional information regarding cloud service providers, refer to FIG. 1B.

The client(s) (120) may be implemented using one or more computing devices. The computing devices may be embodiments of computing devices discussed above. The clients (120) may be implemented using other types of computing devices without departing from the invention. For additional details regarding computing devices, refer to FIG. 4.

The clients (120) may be implemented using logical devices without departing from the invention. For example, the clients (120) may include virtual machines that utilize computing resources of any number of physical computing devices to provide the functionality of the clients (120). The clients (120) may be implemented using other types of logical devices without departing from the invention.

In one or more embodiments of the invention, the client(s) (120) obtain computer implemented services from client service providers (100). A computer implemented service may be an embodiment of the computer implemented services discussed above. The computer implemented services may be other types of services without departing from the invention.

When using the computer implemented services provided by the client service providers (100), the client(s) (120) may generate and/or obtain data which may be stored in the client service providers (100). The client(s) (120) may send requests and/or other messages to the client service providers (100) to perform the computer implemented services. The clients may include other and/or additional functionalities without departing from the invention.

FIG. 1B shows a diagram of a client service provider in accordance with one or more embodiments of the invention. In one or more embodiments of the invention, client service provider A (100A) may be an embodiment of a client service provider of the client service providers (100, FIG. 1A) discussed above. As discussed above, the client service providers provide computer implemented services to users (e.g., clients (120, FIG. 1A)). To provide the aforementioned services, client service provider A (100A) may include a binding manager (102), an application (104), a client service provider application programming interface (API) (106), and persistent storage (110). Client service provider A (100A) may include other and/or additional components without departing from the invention. Each of the aforementioned components of client service provider A (100A) is discussed below.

In one or more embodiments of the invention, the binding manager (102) includes the functionality to translate application programming interface (API) between the application (104) and the client service provider API (106). As a result, the binding manager (102) may obtain API calls from the application, translate API calls, and provide the API calls and/or the translated API calls to the client service provider API (106). Additionally, the binding manager (102) may obtain API call return objects from the client service provider API (106), translate the API call return objects, and provide the API call return objects and/or the translated API call return objects to the application (104). The binding manager (102) may include the functionality to perform all, or a portion, of the method of FIGS. 2A-2B without departing from the invention. For additional information regarding translations of API calls, refer to FIGS. 2A-2B. The binding manager (102) may include other and/or additional functionalities without departing from the invention.

The binding manager (102) may be implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the binding manager (102) described throughout this application and/or all or a portion of the methods illustrated in FIGS. 2A-2B. The binding manager (102) may be some other physical device without departing from the invention.

Figure 2A:
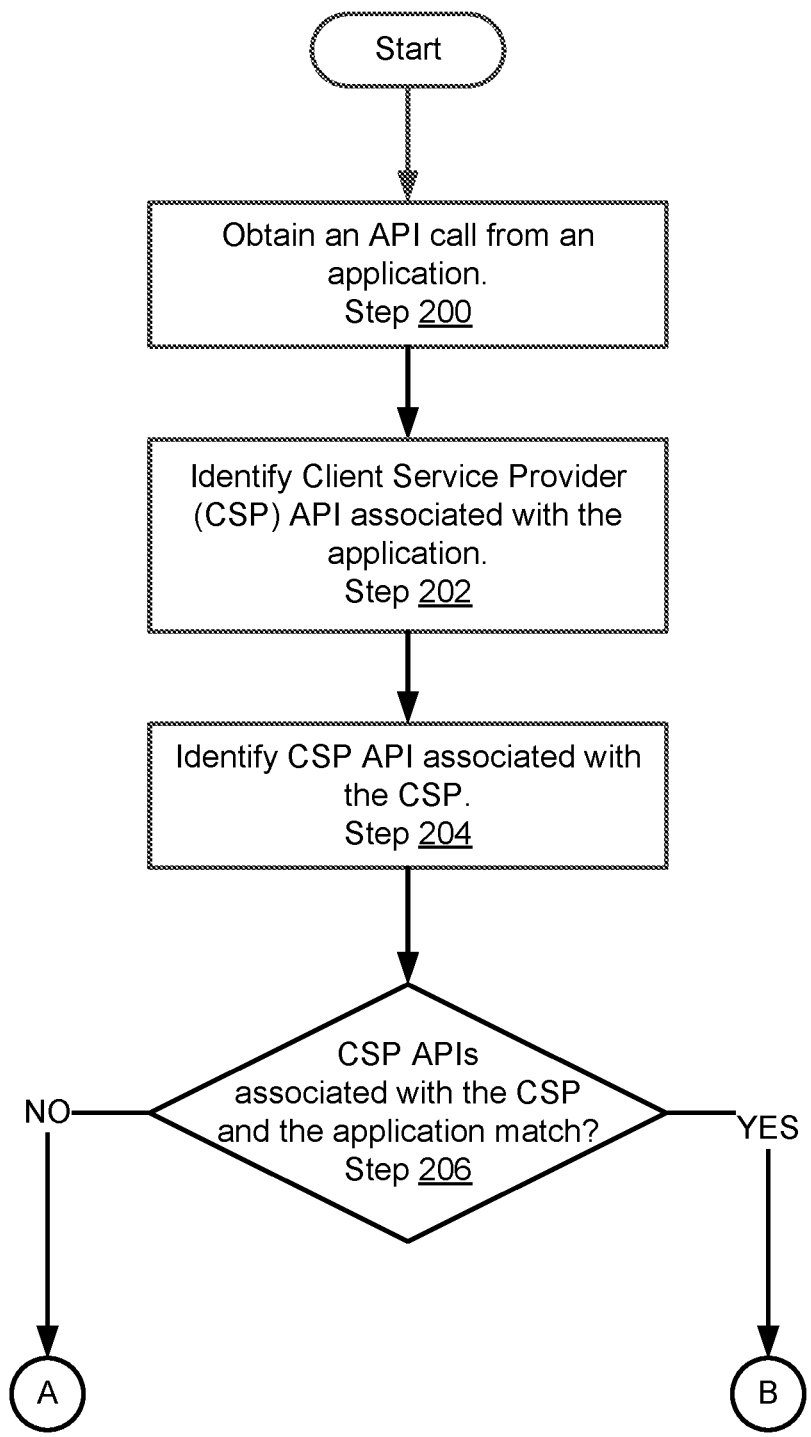
FIGS. 2A-2B shows a flowchart of a method for performing application programming interface calls between applications and cloud service providers in accordance with one or more embodiments of the invention.
Figure 2B:
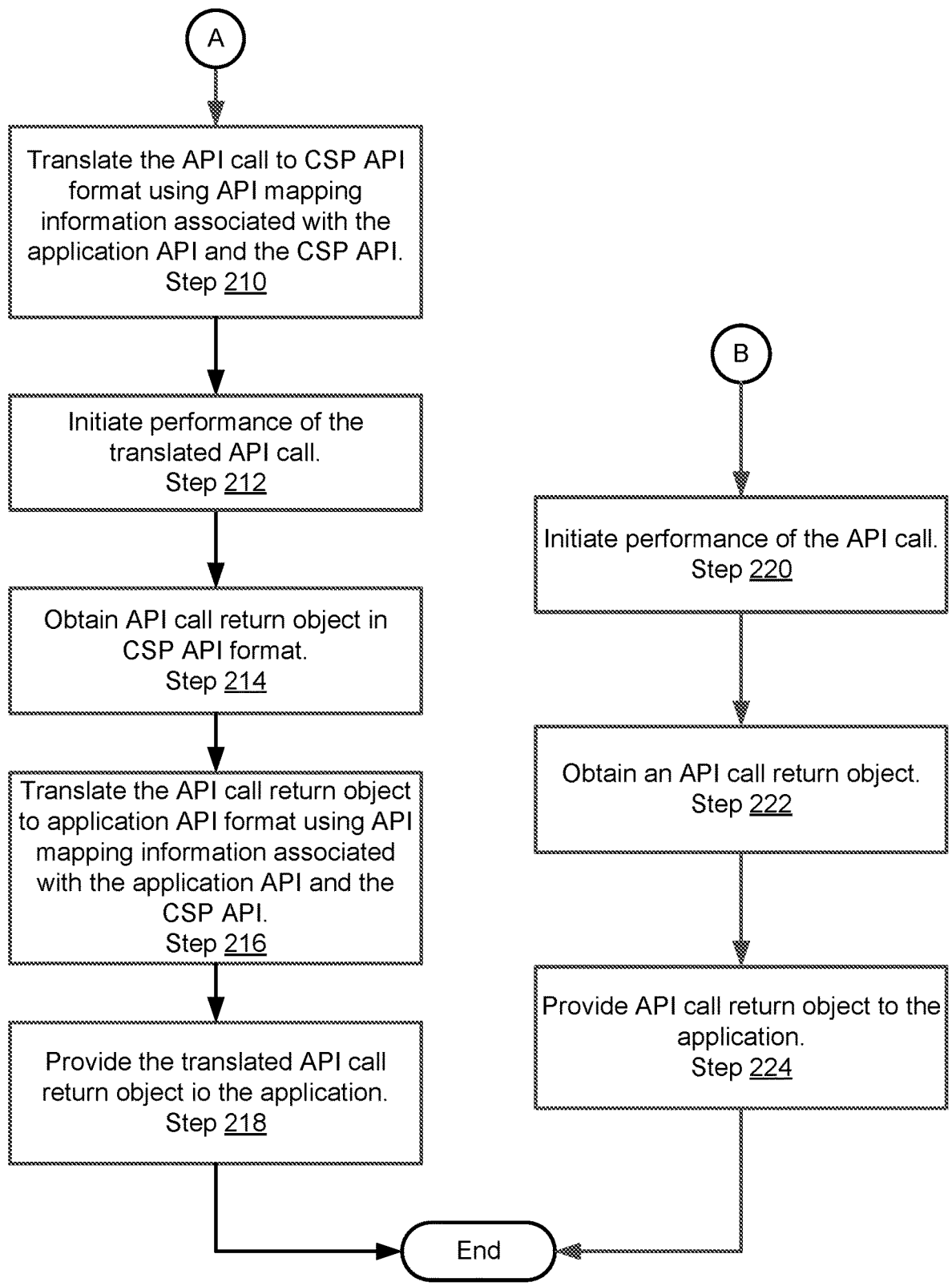

The binding manager (102) may be implemented using computer instructions (e.g., computing code) stored on a persistent storage (e.g., 110) that when executed by a processor of client service provider A (100A) causes execution environment A (100A) to perform the functionality of the binding manager (102) described throughout this application and/or all or a portion of the methods illustrated in FIGS. 2A-2B.

As discussed above, client service provider A (100A) may host an application (104). Client service provider A (100A) may host any number of applications without departing from the invention. The application (104) may be a logical entity executed using computing resources (not shown) of client service provider A (100A). The application (104) may perform a process. In one or more embodiments of the invention, the application(s) (104) provides a computer implemented service to users, e.g., clients (120, FIG. 1A). The application (104) may be, for example, an instance of natural language processor, a machine learning model trainer, and/or other applications without departing from the invention.

The application (104), during the performance of computer implemented services, may make API calls to the client service provider API (106). The API calls may be requests to perform all, or a portion, of the computer implemented services of client service provider A (100A) (e.g., fetch data, process data, move data, delete data, etc.). The application (104) may be written for and/or otherwise configured to make API calls to and obtain API call return objects (e.g., a file, processed data, etc.) from a specific client service provider API. Such API calls may be associated with particular API call references, data formats, and/or API call arguments. If the application (104) is associated with a particular client service provider API that is different (i.e., associated with different API call references, data formats, and/or API call arguments) than the client service provider API executing on the same client service provider that hosts the application (104), then the client service provider API may not be able to perform the API calls made by the application, and the application may not be able to obtain and/or use the API call return objects. The application may include other and/or additional functionalities without departing from the invention.

In one or more embodiments of the invention, the binding manager (102) addresses the incompatibilities between applications associated with different client service provider APIs than the client service provider API of the client service provider hosting the application by translating API calls and API call return objects between heterogeneous applications and client service provider APIs.

Accordingly, if the client service provider API associated with the application (104) matches the client service provider API (e.g., 106) of the client service provider (e.g., client service provider A (100A)) hosting the application (104), then the binding manager (102) may simply provide the API calls to the client service provider API (106) and provide the API call return objects to the application (104) without translating the API calls or the API call return objects. However, if the client service provider API associated with the application (106) is different than the client service provider API of the client service provider hosting the application, then the binding manager (102) may translate the API calls and provide translated API calls to the client service provider API and may also translate the API call return objects and the API call return objects and provide translated API call return objects to the application. Such translations may enable applications to migrate and/or other be deployed to client service providers that include different client service provider APIs that provide similar functionalities to the client service provider APIs associated with the applications without rewriting and/or otherwise modifying the applications and/or the client service provider APIs.

In one or more embodiments of the invention, the client service provider API (106) includes the functionality to perform API calls for the application (104). Performing API calls may include performing all, or a portion, of the aforementioned computer implemented services of client service provider A (100A). Performing API calls may include, for example, processing application data (114, discussed below) (e.g., performing inferencing using application data, training a machine learning model using application data, etc.), fetching application data (114), storing application data, and/or other and/or additional computer implemented services and/or portions of computer implemented services without departing from the invention. The client service provider API (106) may obtain and/or generate API call return objects as a result of performing API calls. The client service provider API (106) may provide the API call return objects to the application (104). The client service provider API (106) may only be capable of performing API calls associated with a particular set of API call references, API call arguments, and data formats. As a result, the client service provider API may obtain translated API calls from the binding manager (102). The client service provider API (106) may include other and/or additional functionalities without departing from the invention.

In one or more embodiments of the invention, the client service provider API (106) is a physical device. The physical device may include circuitry. The physical device may be, for example, a field-programmable gate array, application specific integrated circuit, programmable processor, microcontroller, digital signal processor, or other hardware processor. The physical device may be programmed to provide the functionality of the client service provider API (106) described throughout this application.

In one or more embodiments of the invention, the client service provider API (106) is implemented as computer instructions, e.g., computer code, stored on a persistent storage that when executed by a processor of host A (100A) causes host A (100A) to provide the functionality of the client service provider API (106) described throughout this application.

In one or more embodiments of the invention, the persistent storage (110) stores data. The persistent storage (110) may be implemented using one or more physical storage devices and/or a logical storage device.

A physical storage device may be hard disk drives, solid state disk drives, tape drives, and/or any other physical storage mediums for the storage of data.

The logical storage device (e.g., virtualized storage) may be a logical entity that utilizes any quantity of storage resources of any number of computing devices for storing data. For example, the logical storage device may utilize portions of storage resources provided by any combination of hard disk drives, solid state disk drives, tape drives, and/or any other physical storage medium of any number of computing devices. The logical storage device may be another type of logical storage without departing from the invention.

The persistent storage (110) may include an API mapping information repository (112) and application data (110. The persistent storage (110) may store other and/or additional data without departing from the invention. Each of the aforementioned data structures stored in the persistent storage (110) is discussed below.

In one or more embodiments of the invention, the API mapping information repository (112) includes one or more data structures that includes client service provider API mappings that may be used by the binding manager to translate API calls and API call return objects. The API mapping information repository information may include entries associated with each cloud service provider API. Each entry may include a cloud service provider API identifier. Each entry may also include a set of API call references, API call arguments, and API call data formats associated with each API call and API call return objects associated with the client service provider API. Each API call and API call return object of a client service provider API may mapped to and/or otherwise associated with analogous API calls (i.e., provide the same functionality) of all client service provider APIs included in the API mapping information repository (112). The API mapping information repository (112) may be generated and/or updated by a user of client service provider (100A). The binding manager (102) may use the API mapping information repository (112) to perform API call and API call return object translations. The API mapping information repository (112) may include other and/or additional information about client service provider APIs (e.g., 106) and may be used for other and/or additional purposes without departing from the invention.

In one or more embodiments of the invention, the application data (114) is one or more data structures that includes data generated and/or used by the application (104) and/or users of the application (104) during the performance of computer implemented services. The application data (114) may be any type of data such image data, text data, and video data generated by users of client service provider A (100A). The application data (114) may include other and/or additional types of data without departing from the invention.

While the data structures (e.g., 112, 114) of the persistent storage (110) are illustrated as separate data structures and have been discussed as including a limited amount of specific information, any of the aforementioned data structures may be divided into any number of data structures, combined with any number of other data structures, and may include additional, less, and/or different information without departing from the invention.

Additionally, while illustrated as being stored in the persistent storage (110), any of the aforementioned data structures may be stored in different locations (e.g., in persistent storage of other computing devices, in memory rather than persistent storage, in a combination of memory and persistent storage, etc.) and/or spanned across any number of computing devices without departing from the invention. Any of the aforementioned data structures may be implemented using, for example, lists, tables, linked lists, databases, and/or other types of data structures.

FIGS. 2A-2B show a flowchart of a method for performing application programming interface calls between applications and cloud service providers in accordance with one or more embodiments of the invention. The method may be performed by, for example, a binding manager (102, FIG. 1B). Other components of the system in FIGS. 1A-1B may perform all, or a portion, of the method of FIGS. 2A-2B without departing from the invention.

While FIGS. 2A-2B are illustrated as a series of steps, any of the steps may be omitted, performed in a different order, additional steps may be included, and/or any or all of the steps may be performed in a parallel and/or partially overlapping manner without departing from the invention.

In step 200, an API call is obtained from an application.

In one or more embodiments of the invention, the application sends the API call to the binding manager using any appropriate methods of data transmission without departing from the invention. A client may send a message to the application. The message may include a request to perform a computer implemented service. As a result, the application may send the appropriate API call associated with the computer implemented service to the binding manager. The API call may be obtained from the application via other and/or additional methods without departing from the invention.

In step 202, the client service provider (CSP) API associated with the application is identified.

In one or more embodiments of the invention, the binding manager uses the API call and the API mapping information repository to identify the CSP API associated with the application. The binding manager may compare the API call with API calls included in each entry of the API mapping information repository. The binding manager may identify the entry that includes the API call, the API call reference, the API call arguments, and/or data format associated with the API call as the entry associated with the CSP API. The binding manager may identify the CSP API associated with the application using the CSP API identifier included in the identified entry. The CSP API associated with the application may be identified via other and/or additional methods without departing from the invention.

In step 204, the CSP API associated with the CSP is identified.

In one or more embodiments of the invention, the binding manager makes a separate API call to the CSP API. The separate API call may include a request for the CSP API identifier associated with the CSP API. In response to the API call, the CSP API fetches the CSP API identifier and provides the CSP API identifier as an API call return object to the binding manager. The CSP API associated with the CSP may be identified via other and/or additional methods without departing from the invention.

In step 206, a determination is made as to whether the CSP APIs associated with the application and the CSP match.

In one or more embodiments of the invention, the binding manager determines whether the CSP APIs associated with the application and the CSP match by comparing the CSP API identifier associated with the application identified in step 202 with the CSP API identifier associated with the CSP obtained in step 204. In one or more embodiments of the invention, if the CSP identifier associated with the application matches the CSP identifier associated with the CSP, then the binding manager may determine that the CSP API associated with the application matches the CSP API associated with the CSP. In one or more embodiments of the invention, if the CSP identifier associated with the application does not match the CSP identifier associated with the CSP, then the binding manager may determine that the CSP API associated with the application does not match the CSP API associated with the CSP. The determination as to whether the CSP APIs associated with the application and the CSP match may be made via other and/or additional methods without departing from the invention.

In one or more embodiments of the invention, if it is determined that the CSP APIs associated with the application and the CSP match, then the method may proceed to step 220 of FIG. 2B. In one or more embodiments of the invention, if it is determined that the CSP APIs associated with the application and the CSP do not match, then the method may proceed to step 210 of FIG. 2B.

Turning to FIG. 2B, in step 210, the API call is translated to the CSP API format using API mapping information associated with the application API and the CSP API.

In one or more embodiments of the invention, the binding manager translates the API call reference, the API call arguments, and/or the API call data format of the API call. The binding manager may identify the API mapping information repository entry associated with the CSP API associated with the CSP using the CSP API identifier obtained in step 204. The binding manager may identify the analogous API call (i.e., the API call associated with the same functionality) included in the identified API mapping information repository entry. The binding manager may use the API call reference, the API call arguments, and the API call data format associated with the CSP API specified by the API mapping information repository entry to translate the API call reference, the API call arguments, and/or the API call data format of the API call obtained from the application in step 200. As a result, the binding manager may obtain a translated API call. The translated API call may include an API call reference, API call arguments and/or argument order, and API call data formats associated with the CSP API of the CSP. The API call may be translated to the CSP API format of the CSP using API mapping information associated with the application API and the CSP API via other and/or additional methods without departing from the invention.

In step 212, the performance of the translated API call is initiated.

In one or more embodiments of the invention, the binding manager initiates the performance of the translated API call by sending the translated API call to the CSP API of the CSP. The translated API call may be sent to the CSP API of the CSP using any appropriate methods of data transmission without departing from the invention. In response to obtaining the translated API call, the CSP API may perform the translated API call. The performance of the translated API call may be initiated via other and/or additional methods without departing from the invention.

In step 214, the API call return object is obtained in CSP API format.

In one or more embodiments of the invention, the CSP API performs the translated API call as discussed above. As a result, the CSP API may generate and/or obtain an API call return object during the performance of the translated API call. The CSP API may send the API call return object to the binding manager using any appropriate methods of data transmission without departing from the invention. The API call return object may include API call references, API call arguments, and/or API call data formats associated with the CSP API. The API call return object may be obtained in CSP API format via other and/or additional methods without departing from the invention.

In step 216, the API call return object is translated to a CSP API format associated with the application using the API mapping information associated with the application API and the CSP API.

In one or more embodiments of the invention, the binding manager translates the API call reference, the API call arguments, and/or the API call data format of the API call return object. The binding manager may identify the API mapping information repository entry associated with the CSP API associated with the application using the CSP API identifier identified in step 202 of FIG. 2A. The binding manager may identify the analogous API call return object (i.e., the API call associated with the same functionality) included in the identified API mapping information repository entry. The binding manager may use the API call reference, the API call arguments, and the API call data format associated with the CSP API associated with the application specified by the API mapping information repository entry to translate the API call reference, the API call arguments, and/or the API call data format of the API call return object obtained from the CSP API in step 216. As a result, the binding manager may obtain a translated API call return object. The translated API call return object may include an API call reference, API call arguments and/or argument order, and API call data formats associated with the CSP API of the application. The API call return object may be translated to the CSP API format of the application using API mapping information associated with the application API and the CSP API via other and/or additional methods without departing from the invention.

In step 218, the translated API call return object is provided to the application.

In one or more embodiments of the invention, the translated API call return object is provided to the application by sending the translated API call return object to the application. The translated API call return object may be sent to the application using any appropriate methods of data transmission without departing from the invention. In response to obtaining the translated API call return object, the application may perform any remaining computer implemented services using the API call return object (e.g., make another API call, provide data to a client, etc.). The translated API call return object may be provided to the application via other and/or additional methods without departing from the invention.

In one or more embodiments of the invention, the method may end following step 218.

In step 220, the performance of the API call is initiated.

In one or more embodiments of the invention, the binding manager initiates the performance of the API call by sending the API call to the CSP API of the CSP. The API call may be sent to the CSP API of the CSP using any appropriate methods of data transmission without departing from the invention. In response to obtaining the API call, the CSP API may perform the API call. The performance of the API call may be initiated via other and/or additional methods without departing from the invention.

In step 222, an API call return object is obtained.

In one or more embodiments of the invention, the CSP API performs the API call as discussed above. As a result, the CSP API may generate and/or obtain an API call return object during the performance of the API call. The CSP API may send the API call return object to the binding manager using any appropriate methods of data transmission without departing from the invention. The API call return object may be obtained in CSP API format via other and/or additional methods without departing from the invention.

In step 224, the API call return object is provided to the application.

In one or more embodiments of the invention, the API call return object is provided to the application by sending the API call return object to the application. The API call return object may be sent to the application using any appropriate methods of data transmission without departing from the invention. In response to obtaining the API call return object, the application may perform any remaining computer implemented services using the API call return object (e.g., make another API call, provide data to a client, etc.). The API call return object may be provided to the application via other and/or additional methods without departing from the invention.

In one or more embodiments of the invention, the method may end following step 224.

EXAMPLE

Figure 3A:
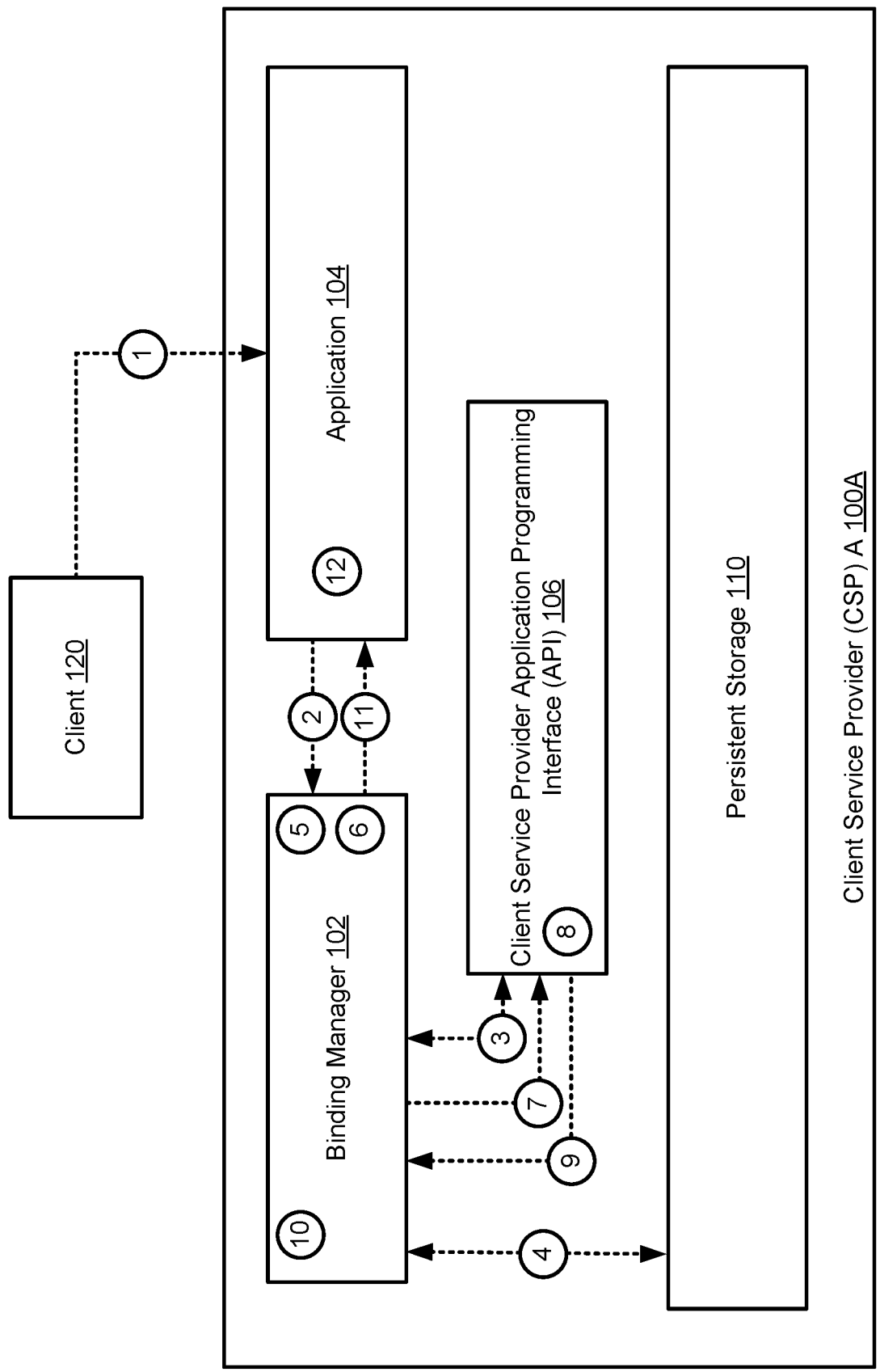
FIGS. 3A-3B show diagrams of the operation of an example system over time in accordance with one or more embodiments of the invention.
Figure 3B:
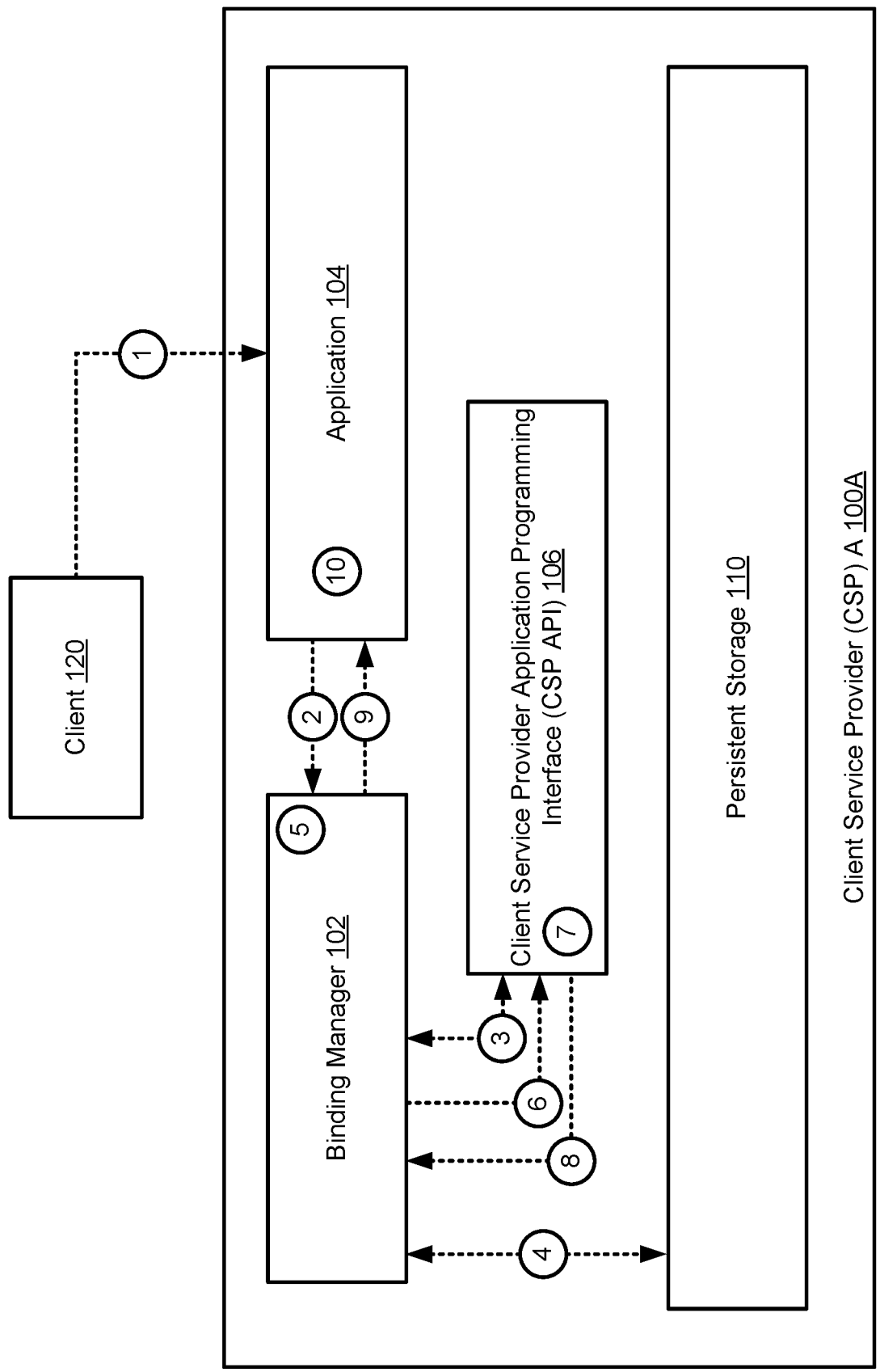

To further clarify embodiments of the invention, a non-limiting example is provided in FIGS. 3A-3B. FIGS. 3A-3B show diagrams of the operation of an example system over time in accordance with one or more embodiments of the invention. FIGS. 3A-3B show a system similar to that illustrated in FIG. 1A. Actions performed by components of the system are illustrated by numbered, circular boxes interconnected, in part, using dashed lines. For the sake of brevity, only a limited number of components of the system of FIGS. 1A-1B are illustrated in FIGS. 3A-3B.

Turning to FIG. 3A, consider a scenario in which a client sends a request to perform computer implemented services to a client service provider. The example system illustrated in FIG. 3A includes a client (120) and client service provider (CSP) A (100A). CSP A (100A) includes a binding manager (102), an application (104), a client service provider application programming interface (API) (106) and persistent storage. The application (104) migrated to CSP A (100A) from another CSP (not shown) prior to the point in time depicted by step 1.

At step 1, the client (120) sends a request to perform computer implemented services to the application (104) of CSP A (100A). In response to obtaining the request to perform computer implemented services, at step 2, the application (104) makes an API call associated with the requested computer implemented services and sends the API call to the binding manager (102). At step 3, the binding manager makes a separate API call to the CSP API (106) for the CSP API identifier associated with the CSP API. The CSP API (106) fetches the CSP API identifier and provides the CSP API identifier to the binding manager (102). At step 4, the binding manager (102) obtains API mapping information repository entries associated with the API call and the CSP API identifier from the persistent storage (110). At step 5, the binding manager (102) makes a determination that the CSP API associated with the application (104), (i.e., the CSP API the application was configured for) does not match the CSP API (106) using the CSP API identifiers associated with the API call and the CSP API (106).

As a result, at step 6, the binding manager (102) translates the API call using the API mapping information repository entry associated with CSP API (106) to obtain a translated API call. At step 7, the binding manager (102) sends the translated API call to the CSP API (106). In response to obtaining the translated API call, at step 8, the CSP API (106) performs the translated API call and obtains an API call return object. At step 9, the CSP API (106) provides the API call return object to the binding manager (102). In response to obtaining the API call return object, at step 10, the binding manager (102) translates the API call return object using the API mapping information repository entry associated with the application to obtain a translated API call return object. After obtaining the translated API call return object, at step 11, the binding manager (102) provides the translated API call return object to the application (104). At step 12, the application uses the translated API call return object to perform remaining portions of the requested computer implemented services.

Turning to FIG. 3B, consider a scenario in which a client sends a request to perform computer implemented services to a client service provider. The example system illustrated in FIG. 3B includes as the system of FIG. 3A. However, the application (104) is configured for the CSP API (106).

At step 1, the client (120) sends a request to perform computer implemented services to the application (104) of CSP A (100A). In response to obtaining the request to perform computer implemented services, at step 2, the application (104) makes an API call associated with the requested computer implemented services and sends the API call to the binding manager (102). At step 3, the binding manager makes a separate API call to the CSP API (106) for the CSP API identifier associated with the CSP API. The CSP API (106) fetches the CSP API identifier and provides the CSP API identifier to the binding manager (102). At step 4, the binding manager (102) obtains API mapping information repository entries associated with the API call and the CSP API identifier from the persistent storage (110). At step 5, the binding manager (102) makes a determination that the CSP API associated with the application (104), (i.e., the CSP API the application was configured for) does match the CSP API (106) using the CSP API identifiers associated with the API call and the CSP API (106).

As a result, at step 6, the binding manager (102) sends the API call to the CSP API (106). In response to obtaining the API call, at step 7, the CSP API (106) performs the API call and obtains an API call return object. At step 8, the CSP API (106) provides the API call return object to the binding manager (102). In response to obtaining the API call return object, at step 9, the binding manager (102) provides the API call return object to the application (104). At step 10, the application uses the API call return object to perform remaining portions of the requested computer implemented services.

END OF EXAMPLE

Figure 4:
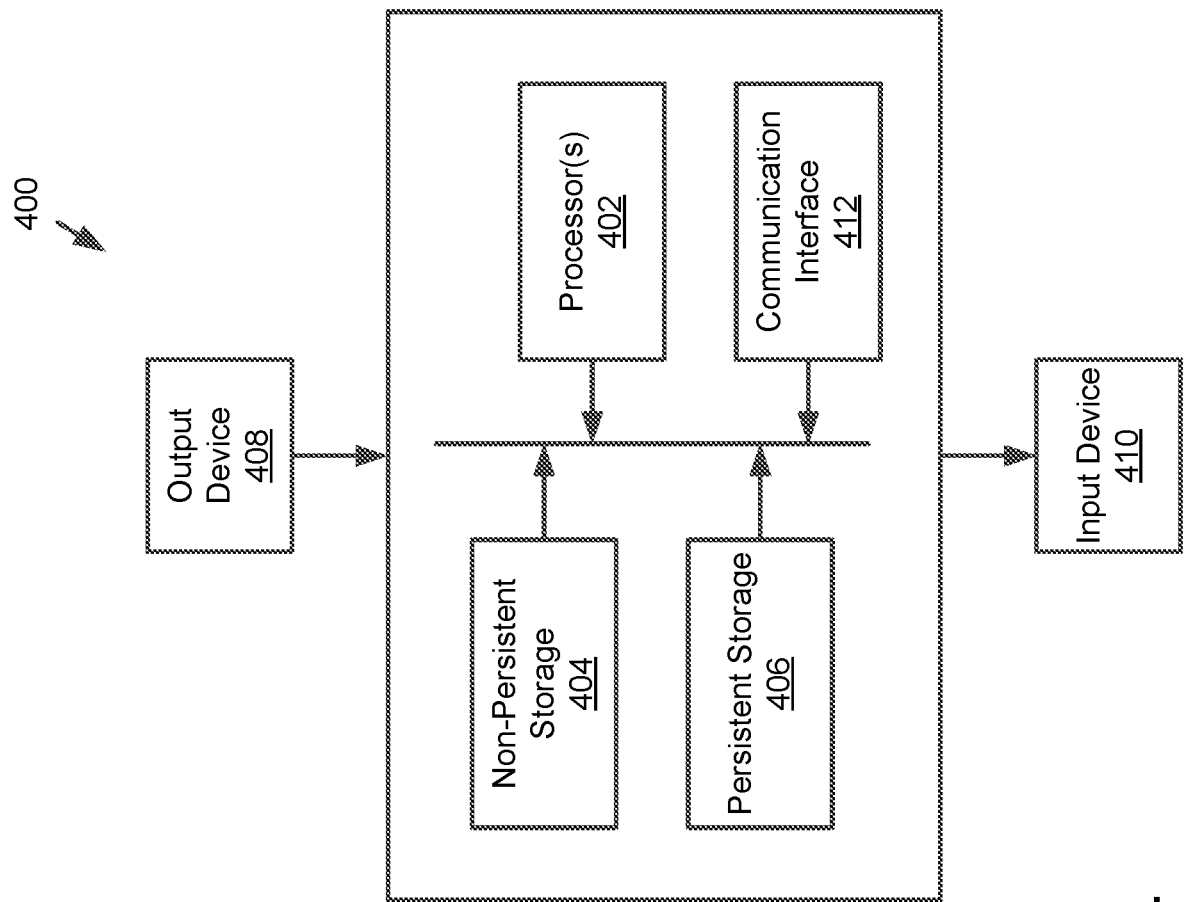
FIG. 4 shows a diagram of a computing device in accordance with one or more embodiments of the invention.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of applications in heterogeneous environments. More specifically, embodiments of the invention relate translating API calls between client service provider (CSP) application programming interfaces (APIs) and applications that are not configured to make API calls to the CSP APIs. A binding manager may obtain API calls from applications, determine if the CSP APIs associated with the application match the CSP APIs executing on the CSPs hosting the applications. The binding manager may translate API calls and API call return objects prior to sending the API calls and the API call return objects to the application and CSP API. As a result, applications may migrate and/or otherwise be deployed to multiple types of CSPs without having to reconfigure the applications and/or the CSP APIs. Accordingly, users of applications may efficiently deploy and/or migrate applications to CSPs.

In traditional systems, the users may have to reconfigure applications prior to migrating and/or deploying the applications to CSPs with incompatible CSP APIs. Otherwise, the applications may be limited to only CSPs that include compatible CSP APIs. Embodiments of the invention improve the computational efficiency of managing applications in such a way that API calls and API call return object may be translated between incompatible applications and CSP APIs.

Thus, embodiments of the invention may address the problem of inefficient use of computing resources to manage applications in heterogeneous environments. This problem arises due to the technological nature of the environment in which the applications are executed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for managing applications, the method comprising:
obtaining, by a binding manager associated with a first cloud service provider (CSP), a first application programming interface (API) call from a first application;
in response to obtaining the first API call, the binding manager:

identifies a first CSP API associated with the first CSP;
identifies a second CSP API associated with the first API call;
make a first determination that the second CSP API does not match the first CSP API; and
in response to the first determination:
translates the first API call into a format associated with the first CSP API to obtain a translated API call;
initiates performance of the translated API call;
obtains a first CSP API call return object in first CSP API format associated with the first CSP API;
translates the first CSP API call return object into a format associated with the second CSP API to obtain a translated CSP API call return object; and
provides the translated CSP API call return object to the first application;
obtaining, by the binding manager, a second API call from a second application;
in response to obtaining the second API call, the binding manager:
identifies the first CSP API is associated with the second application;
identifies the first CSP API is associated with the first CSP;
makes a second determination that the first CSP API associated with the second API call matches the first CSP API associated with the first CSP; and
in response to the second determination:
initiates performance of the second API call;
obtains a second CSP API call return object; and
provides the second CSP API call return object to the second application.

2. The method of claim 1, wherein identifying the second CSP API associated with the first application comprises comparing the first API call to API call mapping information.

3. The method of claim 2, wherein translating the application API call into a format associated with the CSP to obtain a translated API call comprises:
identifying mappings between the first CSP API and the second CSP API using the API mapping information;
translating an API call name of the first API call to an analogous API call name associated with the first CSP API;
translating an API call argument order of the first API call to an API call argument order associated with the first CSP API; and
translating an API call data format of the first API call to an API call data format associated with the first CSP API.

4. The method of claim 3, wherein API mapping information specifies translations between the first CSP API and the second CSP API.

5. The method of claim 1, wherein the first application is written to execute in the second CSP, wherein the second CSP comprises the second CSP API.

6. The method of claim 5, wherein the first CSP comprises the first CSP API and not the second CSP API.

7. The method of claim 6, wherein, prior to obtaining, by the binding manager, the first API call from the first application:
the first application migrates from the second CSP to the first CSP.

8. The method of claim 1, wherein the second application is written to execute in the first CSP, wherein the first CSP comprises the first CSP API.

9. A non-transitory computer readable medium comprising computer readable program code, which when executed by a computer processor enables the computer processor to perform a method for managing applications, the method comprising:
obtaining, by a binding manager associated with a first cloud service provider (CSP), a first application programming interface (API) call from a first application;
in response to obtaining the first API call, the binding manager:
identifies a first CSP API associated with the first CSP;
identifies a second CSP API associated with the first API call;
make a first determination that the second CSP API does not match the first CSP API; and
in response to the first determination:
translates the first API call into a format associated with the first CSP API to obtain a translated API call;
initiates performance of the translated API call;
obtains a first CSP API call return object in first CSP API format associated with the first CSP API;
translates the first CSP API call return object into a format associated with the second CSP API to obtain a translated CSP API call return object; and
provides the translated CSP API call return object to the first application;
obtaining, by the binding manager, a second API call from a second application;
in response to obtaining the second API call, the binding manager:
identifies the first CSP API is associated with the second application;
identifies the first CSP API is associated with the first CSP;
makes a second determination that the first CSP API associated with the second API call matches the first CSP API associated with the first CSP; and
in response to the second determination:
initiates performance of the second API call;
obtains a second CSP API call return object; and
provides the second CSP API call return object to the second application.

10. The non-transitory computer readable medium of claim 9, wherein identifying the second CSP API associated with the first application comprises comparing the first API call to API call mapping information.

11. The non-transitory computer readable medium of claim 10, wherein translating the application API call into a format associated with the CSP to obtain a translated API call comprises:
identifying mappings between the first CSP API and the second CSP API using the API mapping information;
translating an API call name of the first API call to an analogous API call name associated with the first CSP API;
translating an API call argument order of the first API call to an API call argument order associated with the first CSP API; and
translating an API call data format of the first API call to an API call data format associated with the first CSP API.

12. The non-transitory computer readable medium of claim 11, wherein API mapping information specifies translations between the first CSP API and the second CSP API.

13. The non-transitory computer readable medium of claim 9, wherein the first application is written to execute in the second CSP, wherein the second CSP comprises the second CSP API.

14. The non-transitory computer readable medium of claim 13, wherein the first CSP comprises the first CSP API and not the second CSP API.

15. The non-transitory computer readable medium of claim 14, wherein, prior to obtaining, by the binding manager, the first API call from the first application:
the first application migrates from the second CSP to the first CSP.

16. The non-transitory computer readable medium of claim 9, wherein the second application is written to execute in the first CSP, wherein the first CSP comprises the first CSP API.

17. A system for managing applications, the system comprising:
a plurality of client service providers (CSPs); and
a binding manager associated with a first CSP of the plurality of CSPs, comprising a processor and memory, configured to:
obtain, by the binding manager, a first application programming interface (API) call from a first application;
in response to obtaining the first API call, the binding manager:
identifies a first CSP API associated with the first CSP;
identifies a second CSP API associated with the first API call;
make a first determination that the second CSP API does not match the first CSP API; and
in response to the first determination:
translates the first API call into a format associated with the first CSP API to obtain a translated API call;
initiates performance of the translated API call;
obtains a first CSP API call return object in first CSP API format associated with the first CSP API;
translates the first CSP API call return object into a format associated with the second CSP API to obtain a translated CSP API call return object; and
provides the translated CSP API call return object to the first application;
obtain, by the binding manager, a second API call from a second application;
in response to obtaining the second API call, the binding manager:
identifies the first CSP API is associated with the second application;
identifies the first CSP API is associated with the first CSP;
makes a second determination that the first CSP API associated with the second API call matches the first CSP API associated with the first CSP; and
in response to the second determination:
initiates performance of the second API call;
obtains a second CSP API call return object; and
provides the second CSP API call return object to the second application.

18. The system of claim 17, wherein identifying the second CSP API associated with the first application comprises comparing the first API call to API call mapping information.

* * * * *